2,759,775

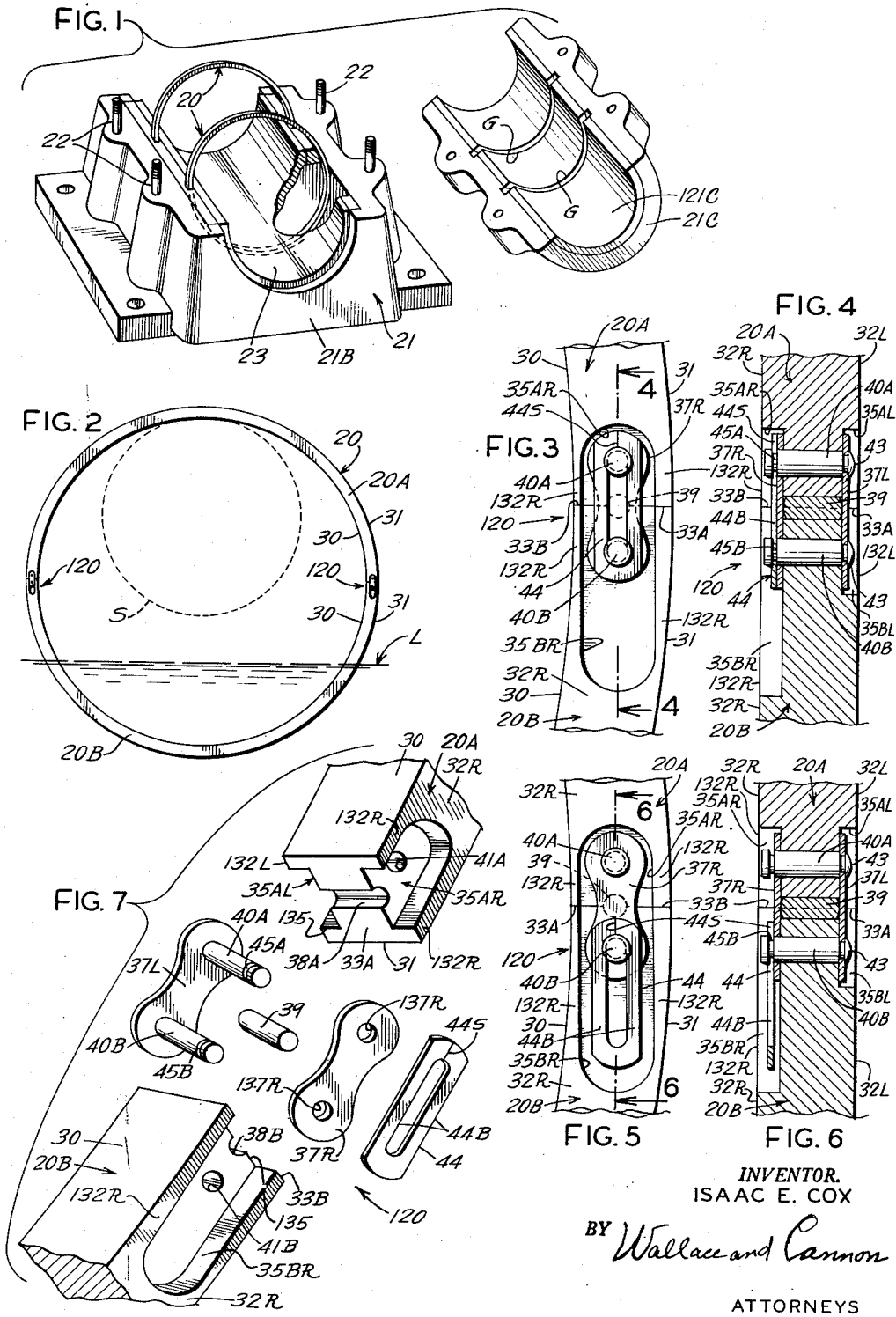

OIL RINGS

Isaac Eugene Cox, Kirkwood, Mo., assignor to American Brake Shoe Company, Wilmington, Del., a corporation of Delaware Application April 6, 1954, Serial No. 421,400

15 Claims. (Cl. 308—129)

This invention relates to oil rings of the kind used in association with rotative bearings to elevate lubricant from a reservoir onto the rotating shaft or journal within or closely adjacent to the rotative bearing.

Oil rings of the aforesaid character take many different forms and are widely used in industry, and in all instances of which we are aware, these oil rings are in the form of a continuous one-piece ring so that mounting of the ring in position on and about a rotative shaft or the like usually requires removal of the shaft from at least one of the bearings in which it is supported. While this procedure is quite satisfactory in those instances where the weight supported by the shaft is relatively small, and in those instances where the lifting or removal of the shaft may be easily accomplished, there are many situations in industry where the lifting or removal of the shaft is extremely difficult. In view of this, it is the primary object of the present invention to enable oil rings to be installed, or removed and replaced, without the necessity for removing the shaft or journal from its normal supported position in the related bearing means. More specifically, it is an object of the present invention to enable oil rings of the aforesaid character to be formed from a plurality of separably related sections, thereby to enable these rings to be mounted or removed and replaced without removal of the shaft or journal from its supporting bearings. Other and related objects are to enable sections of an oil ring to be readily and easily connected together or disconnected as required, and to accomplish such detachable connection of the sections of an oil ring in such a way that the sections are held rigidly in the desired relationship during long continued use of the sectional oil rings, and to accomplish the connection by means of connecting elements that are simple and economical in construction, convenient in attachment and removal, and which connecting means are readily available at low cost and as accurately formed commercial products.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Fig. 1 is a schematic perspective view illustrating a bearing with which oil rings embodying the present invention are associated;

Fig. 2 is an enlarged front elevational view of an oil ring embodying the invention;

Fig. 3 is an enlarged elevational view of one of the plurality of similar separable joints embodied in the oil ring shown in Fig. 2;

Fig. 4 is a cross sectional view taken substantially along the line 4—4 of Fig. 3;

Fig. 5 is a view similar to Fig. 3 showing the connecting means of the joint in a partially released position;

Fig. 6 is a cross sectional view taken along the line 6—6 of Fig. 5; and

Fig. 7 is an enlarged fragmentary perspective view of the elements of the separable joint structure with the parts thereof illustrated in an exploded relationship.

For purposes of disclosure, the invention is herein illustrated as embodied in a pair of oil rings 20 that are shown in Fig. 1 in their positions of use in a commercial bearing 21 that has a hollow base 21B and a removable top member or cap 21C that may be secured in position on the top of the base 21 by means including bolts 22. In the form herein shown, the base 21B has a separately formed semi-cylindrical bearing liner 23, and this is supported in the base 21B so that a shaft S, Fig. 2, may be supported in the bearing liner 23, and within the hollow base 21B and beneath the bearing liner 23, an oil reservoir is formed which may contain a supply of lubricant. The bearing rings 20 are arranged in the present instance so that they may rest upon the top of the shaft S as shown in Fig. 2 and extend downwardly through suitable openings in the base 21B and about and beneath the liner 23 so that the portion of the ring 20 will be disposed in a body of lubricant or oil which may extend upwardly within the hollow base 21B to a level such as that indicated at L in Fig. 2 of the drawings.

The rings 20 will, of course, rest upon the upper surface of the shaft S, and upon rotation of the shaft S, the frictional contact between the rings 20 and the shaft S will produce rotative movement of the rings 20, thus to carry lubricant upwardly and deposit the same on the upper surfaces of the shaft S in accordance with known practice, and guide means are usually provided in association with such rings to maintain the rings in the proper axial position. In the present instance, such guide means are afforded primarily by arcuate guide grooves G that are formed on the internal surface of the bearings material 121C of the cap 21C in such positions as to loosely embrace the upper portions of the rings 20.

In accordance with the present invention, each oil ring 20 is sectional in character so as to embody a plurality of separately formed arcuate sections, and in the embodiment herein shown, each oil ring 20 is formed in two such sections, 20A and 20B, each of which affords 180° or one-half of the total circumference of the ring 20, and these two sections 20A and 20B are detachably connected together in a rigid relationship by joints 120. The joints 120 are so arranged that all of the elements of each joint are disposed in a protected and out of the way relationship with respect to the outer cross sectional perimeter of the ring 20, thus to allow for free rotative movement of the ring 20 in and with respect to the various kinds of conventional guiding surfaces or devices such as the grooves G shown in Fig. 1 hereof. The details of the joints 120 are fully illustrated in Figs. 3 to 7 of the drawings, and it will be observed that in Figs. 3 to 4, the elements of the joint are shown in their assembled relation; in Figs. 5 and 6, the elements of the joint are shown in a partially disconnected relationship while in Fig. 7 of the drawings, the elements that make up each joint 120 are shown in a fragmentary exploded perspective relationship.

It will be observed particularly in Fig. 7 of the drawings, that the oil ring 20 as herein shown is substantially square in its cross sectional form, so as to afford an inner annular face 30, an outer annular face 31, and parallel right and left hand said side faces 32R and 32L. The sections 20A and 20B are arranged so as to afford generally flat end faces 33A and 33B that may be placed together in an end-butted relationship with the corresponding inner, outer and side surfaces in alignment with each other, and means are afforded for releasably or detachably holding these end surfaces 33A and 33B firmly in such abutment, and as hereinbefore pointed out, these securing means are arranged so that they are located in a recessed or protected relationship entirely within the cross sectional perimeter of the ring as such perimeter is defined by the inner face 30, the outer face 31 and the side faces 32L and 32R.

In affording such a connecting means located in the protected relationship above described, opposite lateral faces of the sections such as the side faces 32L and 32R of the ring sections 20A and 20B are provided with recessed pockets adjacent the ends of the sections and on both sides of the ring section, and extending in each instance toward and through the end face 33A or 33B, as the case may be. Thus, the section 20A has a pair of pockets 35AR and 35AL formed respectively in the side surfaces 32R and 32L and extending through the end surface 33A, while the section 20B has pockets 35BR and 35BL formed therein and extending through the end surface 33B. The pockets 35 are somewhat narrower than the side faces in which they are formed, and this results in leaving narrow continuation surfaces 132R and 132L along opposite sides of the respective pockets as continuations of the surfaces 32R and 32L respectively. Hence, continuous annular guiding surfaces will be afforded in the assembled ring for engagement with various kinds of conventional guide means that are used with oil rings. These protecting pockets are so arranged as to have bottom surfaces 135, Fig. 7, which will be aligned on opposite sides of the ring when the ring sections are placed in their assembled relationship, and this is clearly illustrated in Figs. 4 and 6 of the drawings, and a pair of connecting links 37L and 73R are disposed in the respective sets of aligned pockets so as to extend across the butt joint that is afforded by the surfaces 33A and 33B.

Means are provided which extend through the respective sections 20A and 20B and which connect the links 37L and 37R in such a way as to hold the links firmly against the bottom surfaces of the pockets, and this serves to prevent relative lateral displacement of the sections 20A and 20B at the joint. The particular way in which the links 37L and 37R are connected and associated with the sections 20A and 20B will be described in detail hereinafter, but it might first be pointed out that it is of utmost importance to prevent relative displacement of the sections 20A and 20B at the joint 120 in a direction radially of the ring, an this is readily and easily accomplished in the present instance by affording interlocking means that include semi-circular transverse grooves 38A and 38B formed in the surfaces 33A and 33B, preferably about midway between the inner and outer surfaces 30 and 31, and perpendicular to the bottom surfaces of the pockets, it being noted that these bottom surfaces of the pockets are perpendicular to the surfaces 33A and 33B respectively, and are parallel to each other in each section and are parallel to the surfaces 32L and 42R. Thus, when the sections 20A and 20B are placed in their end-butted relation, the two semi-circular grooves 38A and 38B will be disposed opposite each other and will define a cylindrical recess, and an aligning pin 39 of a diameter which will completely fill the mated grooves 38A and 38B is placed therein so that so long as the surfaces 38A and 38B are held together in an endwise or abutting relationship, the joined sections of the ring 20 will be held against relative displacement radially of the ring. Moreover, it will be noted that the aligning pin 39 is made of such a length that it will abut the connecting links 37R and 37L when these links are in position against the bottoms of the clearance pockets so that the pin 39 will be held in position by such links.

The means for holding the links 37R and 37L in position within the clearance pockets, and for cooperating with the links to hold the end surfaces 33A and 33B in firm abutment, are afforded by a pair of connecting pins 40A and 40B that are extended through complemental bores 41A and 41B formed respectively in the sections 20A and 20B so as to extend between the two pockets of the respective sections in parallel relation, and spaced substantially from the respective end surfaces 33A and 33B. The opposite ends of the connecting pins 40A and 40B are connected with the respective links 37R and 37L in such a way that at least one such link may be readily disconnected from these pins, thus to facilitate ready connection and disconnection of the joints 120. In the present instance, such a structure is afforded by resort to the use of conventional and readily available connecting units that are utilized commercially for connecting the ends of a roller type chain. In such a connecting unit, as will be readily evident in Figs. 3 to 7 of the drawings, one link such as the link 37L has the adjacent ends of the pins 40A and 40B permanently connected thereto by means of riveted connections 43, thus to locate the two connecting pins 40A and 40B in a perpendicularly projecting parallel relationship with respect to the link 37L.

Where such commercial connecting units are employed, the spacing of the bores 41A and 41B is, of course, arranged to conform with the spacing of the pins 40A and 40B in the commercial unit. This assembly that is afforded by the link 37L and the pins 40A and 40B may, of course, be readily inserted to the position shown in Figs. 3 to 6, and the other link 37R which has openings 137R, Fig. 7, is then placed in position such that these openings 137R embrace the opposite ends of the pins 40A and 40B, and within the pockets that are formed in the sides 32R of the ring sections. The link 37R is held in place on the pins 40A and 40B by means of a releasable spring fastener 44 that is somewhat like a conventional C-ring, but which is elongated in character so that it may extend along the outer face of the link 37R and engage annular retaining grooves 45A and 45B that are formed in the respective pins 40A and 40B in spaced relation to the adjacent ends of these pins. When in this relation, the fastener 44 will hold the two links 37L and 37R in firm engagement with the bottoms of the respective clearance pockets. In this respect, it should be noted that where a commercially available connector unit is to be employed, the spacing of the bottom surfaces 135 of the clearance pockets on opposite sides of the ring sections must be coordinated with the location of the grooves 45A and 45B in order to assure firm holding of the links 37L and 37R against the bottoms 135 of the pockets.

It will be observed in Figs. 4 to 7 that each removable spring fastener 44 has a slit 44S formed at one end thereof so that the side bars 44B of the fastener may be spread apart at the ends adjacent to this slit 44S, thus to release this end of the spring fastener 44 from the groove of one connecting pin such as the connecting pin 40A shown in Fig. 4. When the bars 44B have thus been separated, this spring fastener 44 may be slid downwardly as viewed in Figs. 3 and 4 to the position shown in Figs. 5 and 6, and to enable this movement to take place, it will be observed that the pocket 35BR is made substantially longer than the other pockets, as shown in Figs. 3 to 7. Then, after the separable or spreadable end of the fastener 44 has been located in the position shown in Figs. 5 and 6, this end may again be separated or spread apart, and by further downward movement of the spring fastener 44, the fastener may be removed or released from the other pin such as the connecting pin 40B. When the fastener 44 has thus been removed, the link 37R may be removed from the connecting pins 40A and 40B, and the two connecting pins and the associated link 37L may be removed by endwise actuation of the pins in a right-hand direction, as viewed in Figs. 4 and 6. This effects disconnection of the joint 120. Connection of the joint 120 may, of course, be accomplished by a reversal of the above described operations, and such connection or disconnection may be done by a workman while the shaft such as the shaft S remains in positon, it merely being necessary in the form herein shown to remove the bearing cap 21C. In a ring-removal operation, one of the joints 120 may be first disconnected, and thereafter, by freely accomplished manual rotation of the ring, the other joint may be brought into position for convenient disconnection, as above described.

After such disconnection, the sections of the ring may be removed, and by reversal of the foregoing operations, a new ring 20 may be put in place. It will be observed that the convenience of the separable joint of the present invention comes into play in both the mounting and removing operations.

From the foregoing description it will be apparent that the present invention enables oil rings to be conveniently installed, removed or replaced while the related shaft or journal remains in position in its bearing means, and it will also be evident that the present invention enables oil rings to be formed from a plurality of related but separate sections, thus to simplify and reduce the cost of manufacture thereof, while at the same time enabling convenient removal or replacement of the oil rings without removing the shaft from its supporting bearings. It will also be apparent that the connection that is afforded by the present invention between the sections of an oil ring is accomplished in such a way that the connecting elements are all located in protected positons within the cross sectional perimeter of the completed ring, thus to enable the sectional ring to be used with conventional guiding means.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In an oil ring, a plurality of separately formed arcuate sections of identical cross section defined by continuous inner, outer and side faces and having matching end surfaces each lying in a single plane and disposed in aligned end-to-end butt joint relation to form a ring, said sections each having pockets formed in corresponding opposite faces thereof adjacent to each end and extending to the ends thereof, and detachable means located in a protected relation in said pockets and having elements extending through each of said sections at each juncture between sections to hold said sections firmly in such end-to-end abutting relation.

2. In an oil ring, a plurality of separately formed arcuate sections of identical cross section defined by continuous inner, outer and side faces and having matching end surfaces each lying in a single plane and disposed in aligned end-to-end butt joint relation to form a ring, matching aligning recesses in said end surfaces, aligning members disposed in and complemental to said aligning recesses, and releasable means recessed into opposite faces of said sections and operable to hold said sections firmly in such end-to-end abutting relation.

3. In an oil ring, a plurality of separately formed arcuate sections of identical cross section defined by continuous inner, outer and side faces and having matching end surfaces each lying in a single plane and disposed in aligned end-to-end butt joint relation to form a ring, matching aligning recesses in said end surfaces, aligning members disposed in and complemental to said aligning recesses, a pair of links disposed at each juncture between sections and recessed into opposite faces of said sections and extending across the meeting lines of the adjacent sections, and releasable anchoring means extending through said sections and connecting said links together and to the respective sections to hold said sections firmly in such end-to-end abutting relation.

4. In an oil ring, a plurality of separately formed arcuate sections of identical cross section defined by continuous inner, outer and side faces and having matching end surfaces each lying in a single plane and disposed in aligned end-to-end butt joint relation to form a ring, a pair of links disposed at each juncture between sections and recessed into opposite faces of said sections and extending across the meeting lines of the adjacent sections, and releasable anchoring means extending through said sections and connecting said links together and to the respective sections to hold said sections firmly in such end-to-end abutting relation.

5. In an oil-ring for elevating lubricant from a lubricant reservoir to a rotative shaft or the like, a pair of semi-circular sections having matching end faces at opposite ends thereof each disposed in a single plane and adapted to be disposed in face-to-face butt joint abutment to thereby form a complete ring, said sections having clearance pockets formed in opposite sides thereof opening through said end faces and being defined in part by parallel bottom surfaces disposed in identical spaced relation so that the corresponding bottom surfaces of abutting ends may be disposed in aligned relation, said end faces having mating semi-cylindrical grooves formed therein on axes perpendicular to said bottom surfaces, an interlocking pin mounted in the mating grooves at each joint, said sections having transverse bores formed therein opening into said clearance pockets through and perpendicular to said bottom surfaces, and means for holding said sections together and maintaining said interlocking pins in position comprising, for each joint, a carrier link having a pair of connecting pins rigidly connected thereto and projecting in parallel relation therefrom, said connecting pins extending through said bores to locate said link against the bottoms of the pockets on one side of said ring, a retaining link having openings therein surrounding said connecting pins within the pockets on the other side of the ring, and releasable means engaging the ends of said connecting pins within said last mentioned pockets to hold said retaining link in positon.

6. In an oil-ring for elevating lubricant from a lubricant reservoir to a rotative shaft or the like, a pair of semi-circular sections having matching end faces at opposite ends thereof each disposed in a single plane and adapted to be disposed in face-to-face butt joint abutment to thereby form a complete ring, said sections having clearance pockets formed in opposite sides thereof opening through said end faces and being defined in part by parallel bottom surfaces disposed in identical spaced relation so that the corresponding bottom surfaces of abutting ends may be disposed in aligned relation, said end faces having mating semi-cylindrical grooves formed therein on axes perpendicular to said bottom surfaces, an interlocking pin mounted in the mating grooves at each joint, said sections having transverse bores formed therein opening into said clearance pockets through and perpendicular to said bottom surfaces, and means for holding said sections together and maintaining said interlocking pins in position comprising, for each joint, a pair of connecting pins extending through said bores, a first link located within and against the bottoms of the pockets on one side of said ring, means connecting said first link to the adjacent ends of said connecting pins, a retaining link having openings therein surrounding said connecting pins in the respective pockets on the other side of the ring, and releasable means engaging the ends of said connecting pins within said last mentioned pockets to hold said retaining link in position.

7. In an oil-ring for elevating lubricant from a lubricant reservoir to a rotative shaft or the like, a plurality of arcuate sections having matching end faces at opposite ends thereof each disposed in a single plane and adapted to be disposed in face-to-face butt joint abutment to thereby form a complete ring, said sections having clearance pockets formed in opposite sides thereof opening through said end faces and being defined in part by parallel bottom surfaces disposed in identical spaced relation so that the corresponding bottom surfaces of abutting ends may be disposed in aligned relation, said end faces having opposed mating recesses formed therein, interlocking members complemental to and disposed in the mating recesses at each joint, said sections having transverse bores formed therein opening into said clearance pockets through and perpendicular to said bottom surfaces, and means for holding said sections together and maintaining said interlocking pins in position comprising, for each joint, a carrier link having a pair of connecting pins rigidly connected thereto and projecting in parallel relation therefrom, said connecting pins extending through said bores to locate said link against the bottoms of the pockets on one side of said ring, a retaining link having openings therein surrounding said connecting pins in the pockets on the other side of the ring, and releasable means engaging the ends of said connecting pins within said last mentioned pockets to hold said retaining link in position.

8. In an oil-ring for elevating lubricant from a lubricant reservoir to a rotative shaft or the like, a plurality of arcuate sections having matching end faces at opposite ends thereof each disposed in a single plane and adapted to be disposed in face-to-face butt joint abutment to thereby form a complete ring, said sections having clearance pockets formed in opposite sides thereof opening through said end faces and being defined in part by parallel bottom surfaces disposed in identical spaced relation so that the corresponding bottom surfaces of abutting ends may be disposed in aligned relation, said end faces having opposed mating recesses formed therein, an interlocking member complemental to and disposed in the mating recesses at each joint, said sections having transverse bores formed therein opening into said clearance pockets through and perpendicular to said bottom surfaces, and means for holding said sections together and maintaining said interlocking pins in position comprising, for each joint, a pair of connecting pins extending through said bores, a first link located within and against the bottoms of the pockets on one side of said ring, means connecting said first link to the adjacent ends of said connecting pins, a retaining link having openings therein surrounding said connecting pins in the respective pockets on the other side of the ring, and releasable means engaging the ends of said connecting pins within said last mentioned pockets to hold said retaining link in position.

9. In an oil-ring for elevating lubricant from a lubricant reservoir to a rotative shaft or the like, a plurality of arcuate sections having matching end faces at opposite ends thereof each disposed in a single plane and adapted to be disposed in face-to-face butt joint abutment to thereby form a complete ring, said sections having clearance pockets formed in opposite faces thereof opening through said end faces and being defined in part by parallel bottom surfaces disposed in identical spaced relation and perpendicular to said end faces so that the corresponding bottom surfaces of abutting ends may be disposed in aligned relation, said end faces having mating recesses formed herein, an interlocking member complemental to and mounted in the mating recesses at each joint, said sections having transverse bores formed therein opening into said clearance pockets through and perpendicular to said bottom surfaces, and means for holding said sections together and maintaining said interlocking pins in position comprising, for each joint, a carrier link having a pair of connecting pins rigidly connected thereto and projecting in parallel relation therefrom, said connecting pins extending through said bores to locate said link against the bottoms of the pockets on one side of said ring, a retaining link having openings therein surrounding said connecting pins in the pockets on the other side of the ring, and releasable means engaging the ends of said connecting pins within said last mentioned pockets to hold said retaining link in position.

10. In an oil-ring for elevating lubricant from a lubricant reservoir to a rotative shaft or the like, a plurality of arcuate sections having matching end faces at opposite ends thereof each disposed in a single plane and adapted to be disposed in face-to-face butt joint abutment to thereby form a complete ring, said sections having clearance pockets formed in opposite faces thereof opening through said end faces and being defined in part by parallel bottom surfaces disposed in identical spaced relation and perpendicular to said end faces so that the corresponding bottom surfaces of abutting ends may be disposed in aligned relation, said end faces having mating recesses formed therein, an interlocking member complemental to and mounted in the mating recesses at each joint, said sections having transverse bores formed therein opening into said clearance pockets through and perpendicular to said bottom surfaces, and means for holding said sections together and maintaining said interlocking pins in position comprising, for each joint, a pair of connecting pins extending through said bores, a first link located within and against the bottoms of the pockets on one side of said ring, means connecting said first link to the adjacent ends of said connecting pins, a retaining link having openings therein surrounding said connecting pins in the respective pockets on the other side of the ring, and releasable means engaging the ends of said connecting pins within said last mentioned pockets to hold said retaining link in position.

11. In an oil-ring for elevating lubricant from a lubricant reservoir to a rotative shaft or the like, a plurality of arcuate sections having matching end faces at opposite ends thereof each disposed in a single plane and adapted to be disposed in face-to-face butt joint abutment to thereby form a complete ring, said sections having clearance pockets formed in opposite sides thereof opening through said end faces and being defined in part by parallel bottom surfaces disposed in identical spaced relation so that the corresponding bottom surfaces of abutting ends may be disposed in aligned relation, said end faces having opposed mating recesses formed therein, interlocking members complemental to and disposed in the mating recesses at each joint, said sections having transverse bores formed therein opening into said clearance pockets through and perpendicular to said bottom surfaces, and means for holding said sections together and maintaining said interlocking pins in position and comprising, for each joint, a carrier link having a pair of connecting pins rigidly connected thereto and projecting in parallel relation therefrom, said connecting pins extending through said bores to locate said link against the bottoms of the pockets on one side of said ring, a retaining link having openings therein surrounding said connecting pins in the pockets on the other side of the ring, said pins having annular grooves therein beyond said retaining link, and spring clip means engaging said annular grooves of said connecting pins within said last mentioned pockets to hold said retaining link in position.

12. In an oil-ring for elevating lubricant from a lubricant reservoir to a rotative shaft or the like, a plurality or arcuate sections having matching end faces at opposite ends thereof each disposed in a single plane and adapted to be disposed in face-to-face butt joint abutment to thereby form a complete ring, said sections having clearance pockets formed in opposite faces thereof opening through said end faces and being defined in part by parallel bottom surfaces disposed in identical spaced relation so that the corresponding bottom surfaces of abutting ends are disposed in aligned relation when said sections are formed into a ring, said sections having transverse bores formed therein opening into said clearance pockets through and perpendicular to said bottom surfaces, and means for holding said sections together comprising, for each joint, a pair of connecting pins extending through said bores, a first link located within and against the bottoms of the pockets on one side of said ring, means connecting said first link to the adjacent ends of said connecting pins, a retaining link having openings therein surrounding said connecting pins in the respective pockets on the other side of the ring, said connecting pins having annular grooves formed therein in exposed relation beyond said retaining link, and releasable spring clip means engaging the said grooves of said connecting pins within said last mentioned pockets to hold said retaining link in position.

13. In an oil ring, a plurality of separately formed arcuate sections of identical cross section defined by continuous inner, outer and side faces and having matching end surfaces each lying in a single plane and disposed in end-to-end butt joint relation to form a ring, adjacent end portions of said sections having relatively small complemental pockets formed in corresponding side faces thereof and extending from the ends of the sections so that said pockets have opposing dead ends adjacent open ends that match when said sections are aligned as aforesaid, and detachable means having end portions detachably anchored in respective ones of said pockets with an intermediate portion thereof spanning said matching ends of the pockets to rigidly connect said sections.

14. In an oil ring, a plurality of separately formed arcuate sections of identical cross section defined by continuous inner, outer and side faces and having matching end surfaces each lying in a single plane and disposed in aligned end-to-end butt joint relation to form a ring, adjacent end portions of said sections having relatively small complemental pockets in corresponding side faces thereof and extending from the ends of the sections so that said pockets have opposing dead ends and open ends that match when said sections are aligned as aforesaid, and a link having opposite ends thereof detachably anchored in a protected relation within the respective pockets with an intermediate rigid portion of said link spanning said matching ends to splice and hold said sections firmly in such end-to-end abutting relation.

15. In an oil ring, a plurality of separately formed arcuate sections of identical cross section defined by continuous inner, outer and side faces and having matching end surfaces each lying in a single plane and disposed in aligned end-to-end butt joint relation to form a ring, matching aligning recesses in said end surfaces, aligning members disposed in and complemental to said aligning recesses, adjacent end portions of said sections having relatively small complemental pockets formed in corresponding side faces thereof and extending from the ends of the sections so that said pockets have opposing dead ends and adjacent open ends that match when said sections are aligned as aforesaid, and detachable means having end portions detachably anchored in respective ones of said pockets with an intermediate portion thereof spanning said matching open ends of the pockets to rigidly connect said sections.

References Cited in the file of this patent

UNITED STATES PATENTS

| 1,000,349 | Shaw | Aug. 8, 1911 |
| 1,952,525 | Arms | Mar. 27, 1934 |
| 2,198,909 | Esch | Apr. 30, 1940 |
| 2,363,043 | Clark | Nov. 21, 1944 |
| 2,670,252 | Grant | Feb. 23, 1954 |